A. BOERNER.
COOLING OR COOKING BOX.
APPLICATION FILED JUNE 6, 1918.
1,295,417.
Patented Feb. 25, 1919.
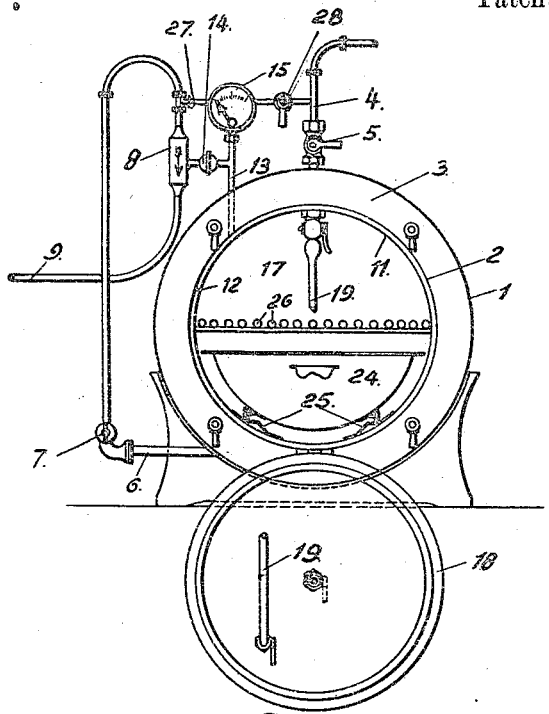
Fig: 1.
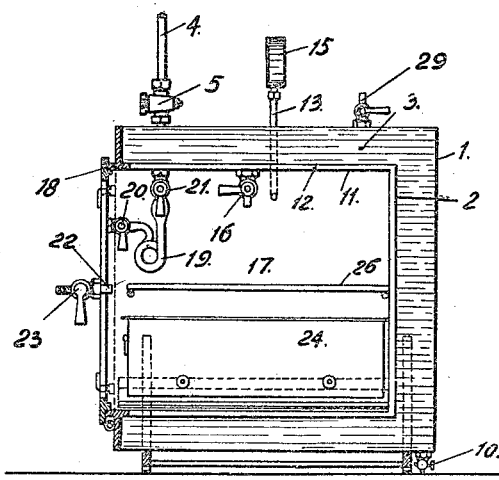
Fig: 2.
INVENTOR
Arno Boerner
BY
ATTORNEYS

UNITED STATES PATENT OFFICE.

ARNO BOERNER, OF SCHEVENINGEN, NETHERLANDS, ASSIGNOR TO NAAMLOOZE VENNOOTSCHAP OCTROOI MAATSCHAPPIJ "HOLLAND" TOT EXPLOITATIE VAN UITVINDINGEN, OF AMSTERDAM, NETHERLANDS.

COOLING OR COOKING BOX.

1,295,417.        Specification of Letters Patent.        Patented Feb. 25, 1919.

Application filed June 6, 1918. Serial No. 238,578.

*To all whom it may concern:*

Be it known that I, ARNO BOERNER, originally a subject of the Emperor of Germany, but having lost my nationality owing to the fact that I have resided outside of Germany for more than thirteen years without interruption and without ever giving notice to the German legations or consulates, residing at Scheveningen, the Netherlands, have invented certain new and useful Improvements in Cooling or Cooking Boxes, of which the following is a specification.

The known ice-boxes with double and even triple walls cannot completely prevent transmission of heat even if high-class insulating material has been used. Such ice-boxes are, therefore, very expensive, not only on account of their high first cost, but also of the considerable consumption of ice. For this reason ice-boxes are not generally used for household purposes, which is the more to be regretted as they permit of preserving for a long time fresh food and drinks so that they might render very valuable services from an economical point of view.

In principle, ice-boxes do not differ from so-called cooking-boxes, *i. e.*, from appliances having for their object to keep food and drinks at a high temperature for a long time, the said high temperature being obtained, for instance, by cooking. Also with this appliance the chamber for receiving the food or drinks is insulated in order that its contents cannot practically lose any heat; such boxes, as a matter of course, do not contain ice, but a plate made of a material having a high specific heat, the said plate after being heated in an arbitrary manner to a high temperature gradually transmitting its heat to the food in the cooking box and so cooking it to a well-done condition without burning it. The known cooking-boxes have the same disadvantageous features as ice-boxes, *i. e.*, their insulating power is not so effective as is desired for the purpose in view, whereas they are rather expensive owing to the high price of good insulating materials.

The present invention is based upon the well-known fact that a vacuum provides for the best insulation. The invention relates to a cooling and cooking-box wherein the insulation is obtained by a vacuum inclosing the chamber for receiving the food or drinks and wherein the vacuum is formed or maintained by a water driven suction pump. If this pump is connected with the water-supply pipe the energy required for evacuating the air from the insulating space is, so to say, had for nothing. If the pump is mounted directly behind the water meter it is driven whenever water is used for household purposes, so that the vacuum is maintained and eventual losses are equalized. If the appliance is used as a cooling-box the water used for driving the pump is preferably led through a jacket of the vacuum space, as water from the water-supply pipe ordinarily has a lower temperature than the atmosphere and consequently assists in cooling the food and prevents heat from soaking through into the cooling chamber.

Finally the new apparatus may be so constructed that the chamber for receiving the food or the like may be connected with the vacuum space so that it may be used for effecting an air-tight closure of jars and the like sterilizing purposes.

An embodiment of the invention is shown, by way of example in the annexed drawing; in this drawing:

Figure 1 illustrates an elevation of the apparatus with its lid opened, and

Fig. 2 is a cross-sectional view.

The apparatus shown comprises a steel cylinder 1 inclosing a second steel cylinder 2. Between these cylinders there is a totally inclosed space 3 into which water may be introduced through a pipe 4 with stop valve 5, the said pipe 4 being connected with the household water meter. From said space 3 the water flows through a pipe 6 with stop valve 7 to a water driven air pump 8, and thence through a pipe 9 to to the household taps. At the bottom a drain cock 10 is provided through which the space 3 may be drained, whereas near the top there is a valve 29 through which the air from the space 3 may escape in case the latter is to be filled with water.

Within the steel cylinder 2 a third steel cylinder 11 is provided the walls of which are at a small distance from those of the cylinder 2, so that another totally inclosed space 12 with comparatively small holding capacity is formed. Said space 12 is provided with a vacuum gage 15, and is connected with the air pump 8 by means of a pipe 13 with stop valve 14. Further the said space 12 may be caused to communicate through a cock 16 with the space 17 inclosed by the cylinder 11. The space 17 has an open front and may be closed air-tight by a cover 18.

The cover 18 has double walls; the hollow space thus formed is connected with the space 12 by means of a flexible pipe 19 adapted to withstand external pressure and provided with stop valves 20 and 21, whereas a pipe 22, which has an air-tight joint with the cover 18 and which is provided with a cock 23, allows the space 17 to be brought into communication with the atmosphere, when the cover is closed.

In the compartment 17 a container 24 is provided which is mounted on wheels movable on rails 25 on the inner walls of the cylinder 11, so that it may easily be withdrawn and introduced again when the cover is opened. Further the said compartment 17 contains a number of grate bars 26.

Finally the pipe 4 may also be brought into direct communication with the pump 8 by means of a by-pass 27 with stop valve 28.

When it is desired to preserve fresh food or drinks on the grate 26, the container 24 is filled with ice and the cover 18 closed, after the valves 5, 7, 14, 20 and 21 have been opened and the valves 10, 16, 28 and 29 closed, assuming the chamber 3 to be filled with water. If now a household tap in the pipe 9 is opened, water from the main flowing through the pipe 4 circulates through the chamber 3, whence it flows through the pipe 6 to the pump 8, whereby said pump is operated so as to evacuate the air from the compartment 12 as well as from the hollow space in the cover 18. A check valve provided on the pump 8 has for its object to maintain the vacuum in the chamber 12 and in the cover also when the pump is stopped.

The vacuum inclosing the compartment 17 insures a very efficient insulating which is rendered still more effective by the fact that the chamber 3 contains water having a temperature which generally is considerably lower than that of the atmosphere, the said water being renewed whenever water is used for household purposes.

If it is desired to cook food at substantially boiling temperature to a well-done condition, the valves 5 and 7 are closed and the valves 28 and 29 opened, after which the water in the chamber 3 is drained by the drain cock 10. Then the cover 18 is opened and, in lieu of ice, a plate of chamotte or the like, previously heated to a high temperature, is placed in the container 24, after which the food is placed on the grate 26 and the space 17 closed air-tight. During these operations the vacuum in the insulating space has not been disturbed. Whenever water is tapped for household purposes, water flows from the pipe 4 and the pipe 27 directly to the pump 8 and thence to pipe 9, so that the vacuum which might have decreased owing to leakage is always maintained. The food in the insulated compartment 17 has now an opportunity to come up to a well-done condition without any further heat being supplied and without being liable to being burnt.

For evacuating the air from jars, tins and the like for sterilizing purposes the valve 16 is opened and the valve 23 closed. The jars or the like, filled with the food to be sterilized and provisionally closed by a loose cover placed upon a rubber ring, are put on the grate 26, the lid 18 is closed air-tight and the pump 8 started, it being immaterial whether the water flows to the pump directly through the pipe 27, or through the chamber 3. By these means a vacuum is formed not only in the chamber 12 and in the hollow space of the cover 18, but also in the compartment 17, so that the air from the jars or the like is evacuated. As soon as the desired degree of vacuum has been attained, which may be controlled by means of the vacuum gage 15, the valve 14 is closed and the cock 23 suddenly opened, whereby air flows rapidly into the compartment 17. The pressure of this air causes the covers of the jars or the like to be firmly pressed upon their seats.

What I claim as my invention and desire to secure by Letters Patent is:

1. An apparatus of the character described, comprising a casing having an airtight cover and adapted to receive the food or the like to be treated, a jacket surrounding the casing and forming an air space, a second jacket surrounding the first jacket and forming a water chamber, means for permitting water to flow through said chamber, and means for evacuating the air from said air space.

2. In apparatus of the type referred to, a casing for receiving the food or the like to be treated and adapted to be closed air-tight by a cover, a jacket inclosing said casing and forming therewith an air space, a water driven pump for evacuating the air from said space, a second jacket inclosing the first jacket and forming therewith a water chamber, and means for allowing the water for actuating the pump to circulate through the said chamber.

3. In apparatus of the type referred to, a casing for receiving the food or the like to be treated and adapted to be closed air-tight by a cover, a jacket inclosing said casing and forming therewith an air space, a water driven pump for evacuating the air from said space, a second jacket inclosing the first jacket and forming therewith a water chamber, a water supply pipe connected with the said chamber, a connection pipe between the said chamber and the pump, and a by-pass between the said supply pipe and the pump.

4. In apparatus of the type referred to, a casing for receiving the food or the like to be treated and adapted to be closed air-tight by a cover, a jacket inclosing said casing and forming therewith an air space, a water driven pump for evacuating the air from said space, and means for bringing the said casing into free communication with the said air space.

5. In apparatus of the type referred to, a casing for receiving the food or the like to be treated and adapted to be closed air-tight by a cover having double walls, a hollow space between said walls, a jacket inclosing said casing and forming therewith a hollow space, a water driven air pump for evacuating the air from the space between the casing and jacket, and a flexible pipe provided with a valve for bringing the said hollow space of the door into free communication with the space between the casing and jacket.

6. In apparatus of the type referred to, a casing for receiving the food or the like to be treated and adapted to be closed air-tight by a cover, a jacket inclosing said casing and forming therewith an air space, a water driven pump for evacuating the air from said space, means for bringing the casing into free communication with the said air space, and means for bringing the casing into free communication with the atmosphere when its cover is closed.

7. In an apparatus of the character described, an air tight casing interposed in a water supply and having an air space surrounding it and a water chamber surrounding the air space, an air pump interposed in the water supply between the casing and the tap of said supply, and a connection between the pump and the said air space.

8. In an apparatus of the character described, an air tight casing having an air space surrounding it and a water chamber surrounding the air space, a water supply connected with the water chamber of the casing, a pipe leading from said chamber, an air pump interposed in said pipe, a connection between the pump and said air space, and a valve connection between the air space and the interior of the casing.

In testimony whereof I have affixed my signature in presence of two witnesses.

ARNO BOERNER.

Witnesses:
H. VERHAGEN, JR.,
PLANTE FÉBRUL.

Copies of this patent may be obtained for five cents each, by addressing the "Commissioner of Patents, Washington, D. C."